(12) United States Patent
Sachs et al.

(10) Patent No.: US 9,800,687 B2
(45) Date of Patent: *Oct. 24, 2017

(54) METHOD AND DEVICE FOR IMPROVING THE TRANSMISSION EFFICIENCY IN A COMMUNICATION SYSTEM WITH A LAYERED PROTOCOL STACK

(71) Applicant: Optis Cellular Technology, LLC, Plano, TX (US)

(72) Inventors: Joachim Sachs, Aachen (DE); Stefan Wager, Esbo (FI); Bela Rathonyi, Beijing (CN)

(73) Assignee: OPTIS CELLULAR TECHNOLOGY, LLC, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/686,805

(22) Filed: Apr. 15, 2015

(65) Prior Publication Data

US 2015/0358427 A1 Dec. 10, 2015

Related U.S. Application Data

(60) Continuation of application No. 11/551,937, filed on Oct. 23, 2006, now Pat. No. 9,014,206, which is a
(Continued)

(51) Int. Cl.
*H04W 74/08* (2009.01)
*H04L 29/08* (2006.01)
(Continued)

(52) U.S. Cl.
CPC .......... *H04L 67/325* (2013.01); *H04L 29/06* (2013.01); *H04L 67/04* (2013.01); *H04L 69/28* (2013.01);
(Continued)

(58) Field of Classification Search
None
See application file for complete search history.

(56) References Cited

U.S. PATENT DOCUMENTS 4,409,592 A 10/1983 Hunt
5,243,595 A 9/1993 Woest et al.
(Continued)

OTHER PUBLICATIONS

Arora, Rajiv et al., Prioritized Access in CSMA Networks: A Node Partitioning Approach, Proceedings of the 13th Conference on Local Computer Networks, pp. 275-280, Oct. 1988.*
(Continued)

*Primary Examiner* — Benjamin Lamont

(57) ABSTRACT

In a method for improving the transmission efficiency in a communication system with a layered protocol stack, data packets are processed on an upper protocol layer. Data packets are forwarded to a lower protocol layer for transmission and the transmission is performed with variable channel access delays. The upper protocol layer is notified by the lower protocol layer when a transmission is started to allow a synchronization of timers in the upper protocol layer. If a layer performs a scheduling of data packets for the transmission, a rescheduling is performed alternatively or in addition during a channel access delay. Devices and software programs embodying the invention are also described.

20 Claims, 7 Drawing Sheets

Related U.S. Application Data division of application No. 09/894,297, filed on Jun. 28, 2001, now Pat. No. 7,145,897.

(51) Int. Cl.
  *H04L 29/06* (2006.01)
  *H04W 28/14* (2009.01)
  *H04W 28/04* (2009.01)
  *H04W 72/12* (2009.01)

(52) U.S. Cl.
  CPC ........... *H04L 69/321* (2013.01); *H04W 28/14* (2013.01); *H04W 72/1242* (2013.01); *H04W 74/0875* (2013.01); *H04L 69/32* (2013.01); *H04W 28/04* (2013.01); *H04W 72/1236* (2013.01)

(56) References Cited

U.S. PATENT DOCUMENTS

| | | | |
|---|---|---|---|
| 5,684,791 | A | 11/1997 | Raychaudhuri et al. |
| 5,708,656 | A | 1/1998 | Noneman et al. |
| 5,936,949 | A | 8/1999 | Pasternak et al. |
| 6,005,853 | A * | 12/1999 | Wang ............... H04L 1/1848 370/332 |
| 6,374,112 | B1 | 4/2002 | Widegren et al. |
| 6,640,105 | B1 * | 10/2003 | Shin ............... H04L 12/2602 455/450 |
| 6,760,308 | B1 | 7/2004 | Ghanma et al. |
| 6,765,870 | B2 * | 7/2004 | Chintada ............. H04L 1/1621 370/230 |
| 2002/0009067 | A1 | 1/2002 | Sachs et al. |

OTHER PUBLICATIONS

IEEE Std 802.11-1997, Part 11: Wireless LAN Medium Access Control (MAC) and Physical Layer (PHY) specifications, Approved Jun. 26, 1997, 33 pages.
3G TS 25.303 V3.4.0 (Jun. 2000), 3rd Generation Partnership Project; Technical Specification Group Radio Access Network; Interlayer Procedures in Connected Mode (Release 1999), 11 pgs.
3G TS 25.301 V3.5.0 (Jun. 2000), 3rd Generation Partnership Project; Technical Specification Group Radio Access Network; Radio Interface Protocol Architecture (Release 1999), 10 pgs.
3rd Generation Partnership Project;Technical Specification Group Radio Access Network; Interlayer Procedures in Connected Mode (Release 1999); 3G TS 25.303 V3.3.0 (Mar. 2000) (25303-330, 75 pgs.).
3rd Generation Partnership Project;Technical Specification Group Radio Access Network; MAC protocol specification (Release 1999); 3G TS 25.321 V3.3.0 (Mar. 2000) (25321-330, 39 pgs).
3rd Generation Partnership Project; Technical Specification Group Radio Access Network; MAC protocol specification (Release 4); 3GPP TS 25.321 V4.5.0 (Jun. 2002) (35321-450, 45 pgs).
3rd Generation Partnership Project;Technical Specification Group Radio Access Network; Radio Interface Protocol Architecture (Release 1999); 3G TS 25.301 V3.4.0 (Mar. 2000) (25301-340, 45 pgs.).
3rd Generation Partnership Project;Technical Specification Group Radio Access Network; Radio Resource Control (RRC); Protocol Specification (Release 4); 3GPP TS 25.331 V4.5.0 (Jun. 2002) (25331-450, 898 pgs.).
3rd Generation Partnership Project; Technical Specification Group Radio Access Network; RLC protocol specification (Release 1999); 3GPP TS 25.322 V3.5.0 (Dec. 2000) (25322-350, 131 pgs).
3rd Generation Partnership Project; Technical Specification Group Radio Access Network;UE Procedures in Idle Mode and Procedures for Cell Reselection in Connected Mode (Release 1999); 3G TS 25.304 V3.2.0 (Mar. 2000) (25304-320, 44 pgs).
Arora, Rajiv et al., Prioritized Access in CSMA Networks: A Node Partitioning Approach, Proceedings of the 13th Conference on Local Computer Networks, p. 275-280, Oct. 1988, 6 pgs.
Zhang, L. "Why TCP Timers Don't Work Well," Aug. 1986, Computer Communication Review, US, Association for Computing Machinery, New York, vol. 16, No. 3, pp. 397-405, 10 pgs.
Leon-Garcia, Alberto and Widjaja, Indra. Communication Networks: Fundamental Concepts and Key Architectures. 2nd Edition in U.S. Appl. No. 11/551,937, 1 pg.
ETSI TS 125 301 V3.5.0 (Jun. 2000); Universal Mobile Telecommunications Systems (UMTS); Radio Interface Protocol Architecture (3G TX 25.301 version 3.5.0 Release 1999), 47 pgs.
Abbott, M.B., et al, "Increasing Network Throughput by Integrating Protocol Layers," Oct. 1993, IEEE/ACM Transactions on Network, US, IEEE, Inc., New York, vol. 1, No. 5, pp. 600-610, 12 pgs.
Averbuch, R., et al., "Dynamic Adaptive Layer 2 Timer Adjustment," Mar. 1997, Motorola Technical Developments, US, Motorola, INc., Schaumburg, Illinois, pp. 21-22, 2 pgs.
European Search Report for International Application No. EP 00114344, dated Jan. 8, 2001, 4 pgs.

* cited by examiner

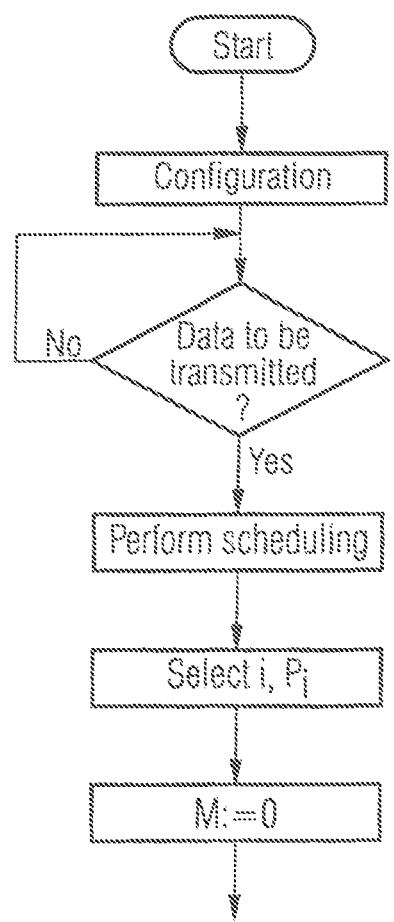

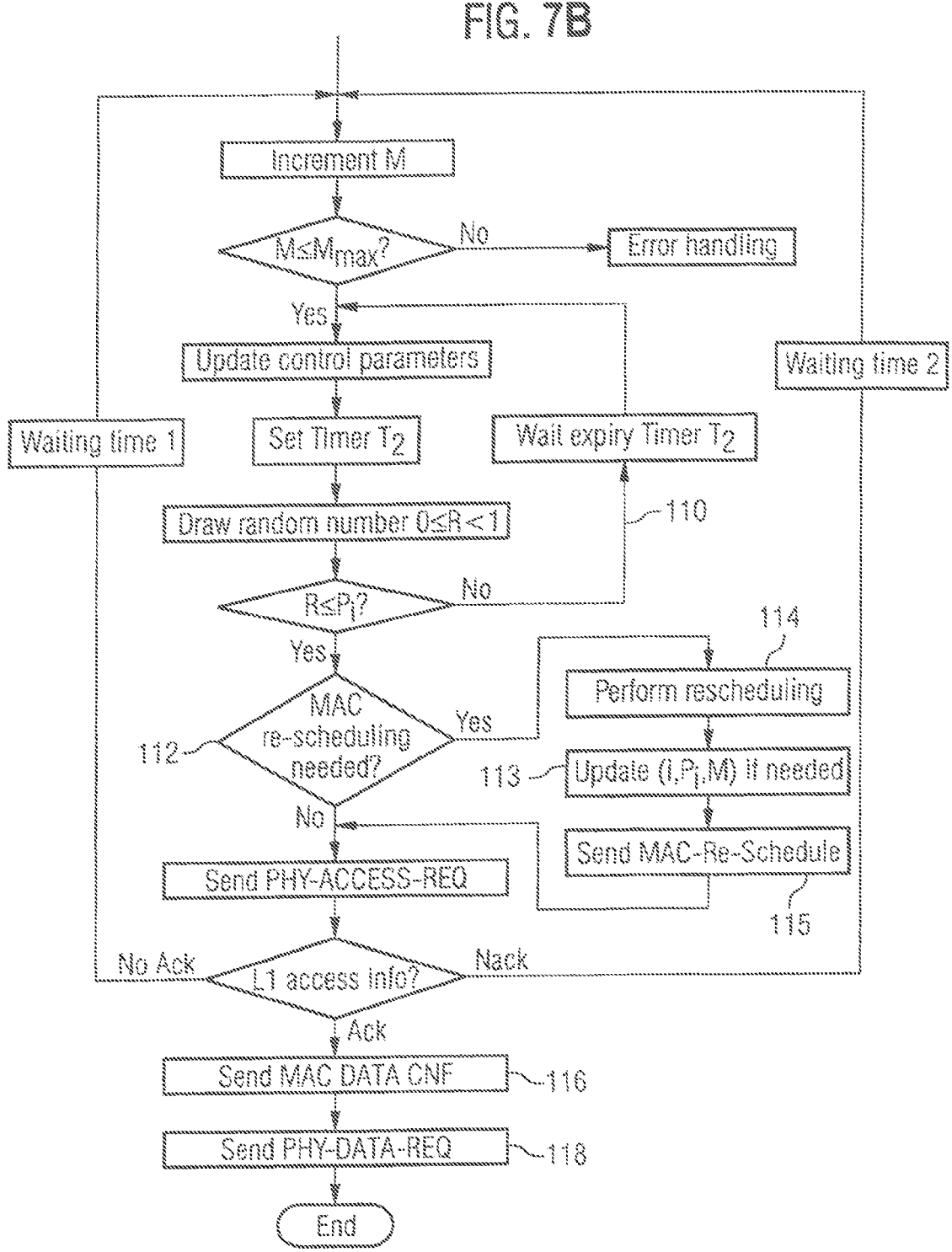

METHOD AND DEVICE FOR IMPROVING THE TRANSMISSION EFFICIENCY IN A COMMUNICATION SYSTEM WITH A LAYERED PROTOCOL STACK

CROSS-REFERENCE TO RELATED APPLICATIONS

This application is a continuation of U.S. application Ser. No. 11/551,937, filed Oct. 23, 2006, now U.S. Pat. No. 9,014,206, which is a divisional of U.S. application Ser. No. 09/894,297, filed Jun. 28, 2001, now U.S. Pat. No. 7,145,897, the disclosures of which are incorporated herein by reference.

BACKGROUND OF THE INVENTION

The present invention relates to a method for improving the transmission efficiency in a communication system with a layered protocol stack, wherein data packets are processed on an upper protocol layer and are forwarded to a lower protocol layer controlling the transmission and wherein transmissions are performed with a channel access delay. Devices and software programs embodying the invention are also described.

A communication system is generally specified using a layered approach. A layer either corresponds to a protocol or can be partitioned into two or more sub-layers corresponding to a protocol each. Every protocol has specific responsibilities for the handling of information which is performed by a specific set of functions and services for the protocol. A central idea behind dividing the functionality between protocols is to achieve a more understandable model of the system and hide details in the different protocols to higher layers in the protocol stack.

An example of a mobile communication system in which layers are subdivided into sub-layers or protocols is a WCDMA (Wideband Code Division Multiple Access) system according to 3GPP ($3^{rd}$ Generation Partnership Project) specifications. In this system, the data link layer is subdivided into the protocols PDCP (Packet Data Convergence Protocol), BMC (Broadcast/Multicast Control), RLC (Radio Link Control) and MAC (Medium Access Control) as described in 3G TS 25.301 V 3.4.0 ($3^{rd}$ Generation Partnership Project).

Information units denoted as primitives are exchanged between different protocol layers to communicate with each other. The primitives are used in message sequence diagrams to illustrate the functional split between the layers and how the protocols interact with each other when a specific high level function is executed. A description of common inter-layer service primitives and the interactions of different protocol layers can be found for the above protocols in 3GPP TS 25.303 V 3.3.0.

One example of a high level function is transmitting data between applications using a random access channel. To perform this function several protocols are involved. A random access channel (RACH) is a well-known concept for communication systems. Several users can transmit data on a RACH independent of each other which results in a risk of collision between transmissions from or to different users. In order to reduce the probability of collisions and increase the probability of successful transmissions on a RACH certain transmission rules are specified, especially waiting times delaying the transmission of data. One example of a waiting time is called a "back-off time" since the user backs off from transmitting any information on the RACH for an interval of time. Waiting times can vary in their length depending on control parameters which are selected for example according to the number of users that use the RACH, i.e. the system load, or the interference level for a radio channel.

Generally, the protocol controlling the transmissions does not indicate the duration of a channel access delay to other protocols which are thus unaware of how much delay is introduced before the transmission starts on the RACH. In a communication system according to 3GPP specifications, the control of random access transmissions is executed in the Medium Access Control (MAC) protocol as described in 3GPP TS 25.321 V3.3.0.

The channel access delay introduced before a transmission is started on a channel can vary considerably. This is a problem if the data transmitted on a channel originates from a protocol comprising timers, for example an ARQ (Automatic Repeat Request) protocol that includes retransmission timers. It is difficult to set proper expiry values on such timers due to the large variance of the delay introduced by the protocol layer controlling the transmission. A timer value can for example be set too large according to some worst case delay, resulting in a slower retransmission time than necessary or according to a value which is too small with a risk that the timer expires and an unnecessary retransmission is performed.

Furthermore, new data will often become available for transmission in the user equipment or a radio base station, e.g. in the RLC protocol, while the protocol controlling transmissions, e.g. MAC, is delaying a transmission of previous data. The additional data is sometimes time critical while the transmission of previous data is less urgent. When new data is ready for transmission on a higher layer, e.g. on the RLC protocol during a RACH procedure, it is not handled by the lower protocol, e.g. MAC, until the transmission procedure for the previous data has ended, i.e. when the data is transmitted on the physical layer. For example if an SMS (Short Message Service) message is sent on the RACH this will delay higher priority data such as a call set-up message until the RACH procedure for the SMS message is finished in the MAC protocol.

BRIEF SUMMARY OF THE INVENTION

It is an object of the present invention to obviate the above disadvantages and provide methods which improve the control of channel access delays and the efficiency of data transmissions in a communication system.

A method is performed in a communication system with a layered protocol stack. Data packets are processed on an upper protocol layer and said processing is performed according to at least one timer of the upper protocol layer. The data packets are forwarded to a lower protocol layer for transmission on a channel, wherein said transmission is controlled by the lower protocol layer. Additionally, the protocol stack can comprise one or more further layers, e.g. a physical layer below the lower layer, the physical layer executing the transmissions, or a layer executing applications. The transmission is performed with variable channel access delays which are caused for example by the control procedures or external conditions.

The start of a transmission is detected by the lower protocol layer. Generally an event, especially the sending of a primitive from the lower protocol layer to a physical layer, initiates the transmission on the channel. If the period of time between event and transmission is defined, it is often preferable to perform the detection of said event. When the start of the transmission is detected, the upper protocol layer is notified by the lower protocol layer of the starting time. At least one timer of the upper protocol layer is synchronized according to the notification. Especially, the notification can be sent at the start of the transmission and the timers can be started when the notification is received. If the transmission is started with an offset from a detected event, timers can be corrected by the offset.

Timers can be set according to actual transmission times and the influence of variable channel access delays removed. In this way the precision of the timing and the control of the delays is significantly enhanced and the efficiency of transmissions can be considerably improved.

The method is especially suitable for a timer which models a round trip time or a back-off time because the performance of the communication system is sensitive to the correct setting of these timers. It is possible that more than one corresponding timer is synchronized in this way.

In a further method for improving the transmission efficiency in a communication system with a layered protocol stack, data packets are also processed on an upper protocol layer and are forwarded to a lower protocol layer controlling the transmission on a channel. Transmissions are performed with a channel access delay and the upper or the lower layer performs a scheduling of data packets before the transmission. In the scheduling, data packets are reordered or priorities are attributed to data packets wherein the priorities determine which data packets are transmitted with preference.

After the scheduling of the data packets is performed, channel access delays can occur. A channel access delay is detected on the lower layer. If necessary, the upper layer can be notified of the length or end of the channel access delay, e.g. by a corresponding primitive. A check is performed whether additional data packets are ready for forwarding to the lower layer at or before the end of the channel access delay. The check can be performed for example by the upper layer or by the lower layer, especially if the latter performs the scheduling. If the traffic situation has changed, i.e. if additional data packets are ready for forwarding or transmission at or before the end of the channel access delay, a further scheduling including the additional and the first data packets is performed, i.e. the data packets are rescheduled for transmission on the channel. If the lower layer performs the scheduling, the data packets or information about the data packets can be forwarded from the upper layer for this purpose. Finally, the data packets are transmitted according to the rescheduling.

The proposed method avoids a blocking of time critical traffic by data packets which were scheduled for transmission at an earlier time. A repeated rescheduling is possible, especially in the case of any subsequent channel access delay. Preferably, the rescheduling is performed as close as possible before the transmission of data packets on a channel. The minimum period which is allowable between the start of the rescheduling and the start of the transmission is the processing time necessary for rescheduling and preparing of the data packets for transmission, which is determined by the processing speed of the device performing the transmission.

In a preferable embodiment of the method, the scheduling is performed on the lower layer. In this case, a notification can be sent from the lower layer to the upper layer requesting a transfer of additional data packets or information about the additional data packets. The upper layer transfers the information or additional data packets to the lower layer in reply to the request. In an alternative embodiment, the lower layer can access a memory which stores corresponding information from the upper layer.

Alternatively, the scheduling is performed on the upper layer. In this case, a notification of the channel access delay by the lower layer initiates the further scheduling. The notification can include the length or end of the channel access delay.

Preferably, protocols for an improved control of the delay in a communication system embody both the above methods for synchronizing timers and rescheduling data.

For the above methods, a notification is preferably sent at the start of a transmission or the end of a delay, especially if the duration of a delay is arbitrary. This allows a simple embodiment of the proposed methods. Alternatively, the notification can comprise a length of a delay before a transmission is started if the length is defined when the notification is sent. This allows an increased processing time, e.g. for the scheduling of data packets.

A total channel access delay can comprise two or more separate components which are determined by different parameters or conditions, e.g. a random initial delay and an access delay. It is often advantageous to perform a notification between the components, especially if the duration of the second component is arbitrary.

When the length of a component of the channel access delay is arbitrary, e.g. determined by a random parameter or external parameters which are not controlled by the communication system, a suitable time for a scheduling or rescheduling is before the arbitrary delay component to ensure sufficient processing time.

Preferably, a scheduling process is finished immediately before the scheduled data packets are transmitted, i.e. the delay between the scheduling procedure and the physical transmission is minimized.

The notification is preferably a primitive which can also be part of a communication procedure consisting of two or more primitives. Information between different protocols can also be exchanged in other ways, for example using shared memories by two or more protocols.

The proposed method is especially suitable for a lower protocol layer which is a medium access control sub-layer of a data link layer, e.g. according to 3GPP specifications. A preferable upper protocol layer is a radio link control sub-layer of a data link layer.

The method is preferable if large variations in the channel access delay are possible. This is especially the case if the transmission is performed on a channel which can be shared by several users and/or data flows because transmission attempts may be unsuccessful due to access collisions or because mechanisms to avoid access collisions introduce variable delays. Examples are a Random Access Channel (RACH) or a Common Packet Channel (CPCH) in the up-link from a user equipment to a base station. A CPCH is defined in the 3GPP specifications for data packet transmission on a channel shared by several users. The method is also applicable for down-link channels from a base station to user equipment, e.g. on a FACH (Forward Access Channel) or on a Downlink Shared Channel (DSCH) on which delays can vary due to traffic queuing.

A device in a communication system is adapted to perform at least one of the above methods. The device is for example a network node like a radio base station for providing wireless access of user equipment to the communication system or a controller of a base station. The device can also be a user equipment like a mobile phone, a personal digital assistant or a laptop computer.

The proposed method can especially be embodied by a program unit on a data carrier or loadable into a device, e.g. a radio base station or user equipment, in a communication system, the unit comprising code for performing the steps of at least one of the above-described methods.

The foregoing and other objects, features and advantages of the present invention will become more apparent in the following detailed description of preferred embodiments as illustrated in the accompanying drawings.

BRIEF DESCRIPTION OF THE DRAWINGS

FIGS. 7A and 7B show a detailed random access channel transmission control procedure according to the invention.

DETAILED DESCRIPTION OF THE INVENTION

Figure 1:
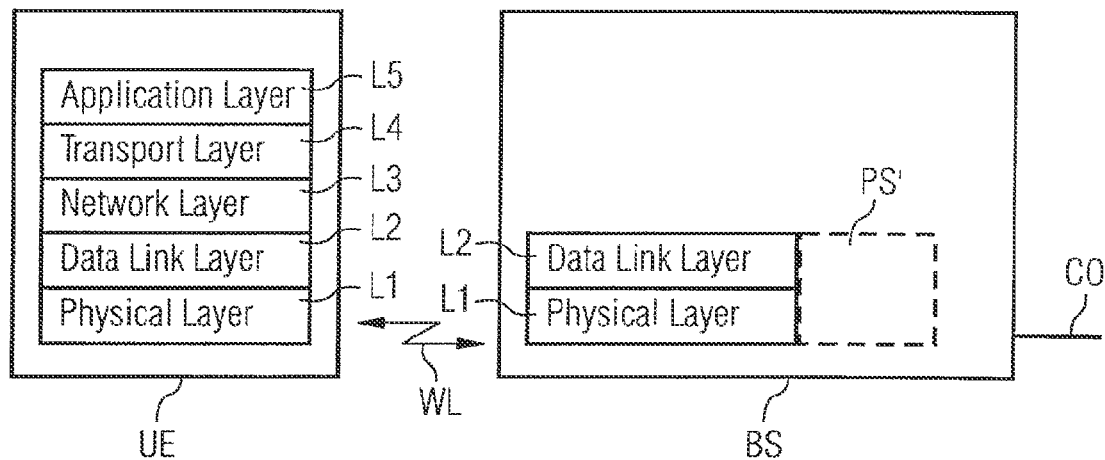
FIG. 1 shows a schematic view of devices in a communication system with different protocol layers.

In FIG. 1, devices in a mobile communication system are schematically depicted. A mobile communication system comprises radio base stations BS which provide access to user equipment UE by wireless connections WL and a core network interconnecting the base stations BS and providing connections to further communication systems. Both user equipment UE and bases stations BS are provided with one or more transmitters and receivers, generally combined into transceivers, to send and receive data on a wireless connection WL. Connections CO of one or several radio base stations BS to the core network are usually established via a controller, e.g. a radio network controller (RNC) which is not shown to simplify the drawing.

On every connection CO, WL, a protocol stack with layers corresponding to each other in the connected devices is defined. As indicated, not all upper layers need to be terminated in adjacent devices as information on said layers can be relayed to further devices. On the wireless connection WL, the protocol stack consists of five layers L1-L5. The data transmission is performed on the physical layer L1. The transmission is controlled by the data link layer L2. Above the data link layer L2, the communication system in the example comprises a network layer L3 for radio resource control, a transport layer L4 and an application layer L5 for performing applications. Lower layers provide services to higher layers while details how the execution of the services is performed are generally not provided to the higher layers. The services are preferably executed by software programs run in a processing system of the base station and user equipment, respectively. Typically, a different protocol stack PS' is used for the transmission of data over the connection CO to the core network. Generally, information from several radio connections WL is multiplexed on a single connection CO to the core network.

Figure 2:
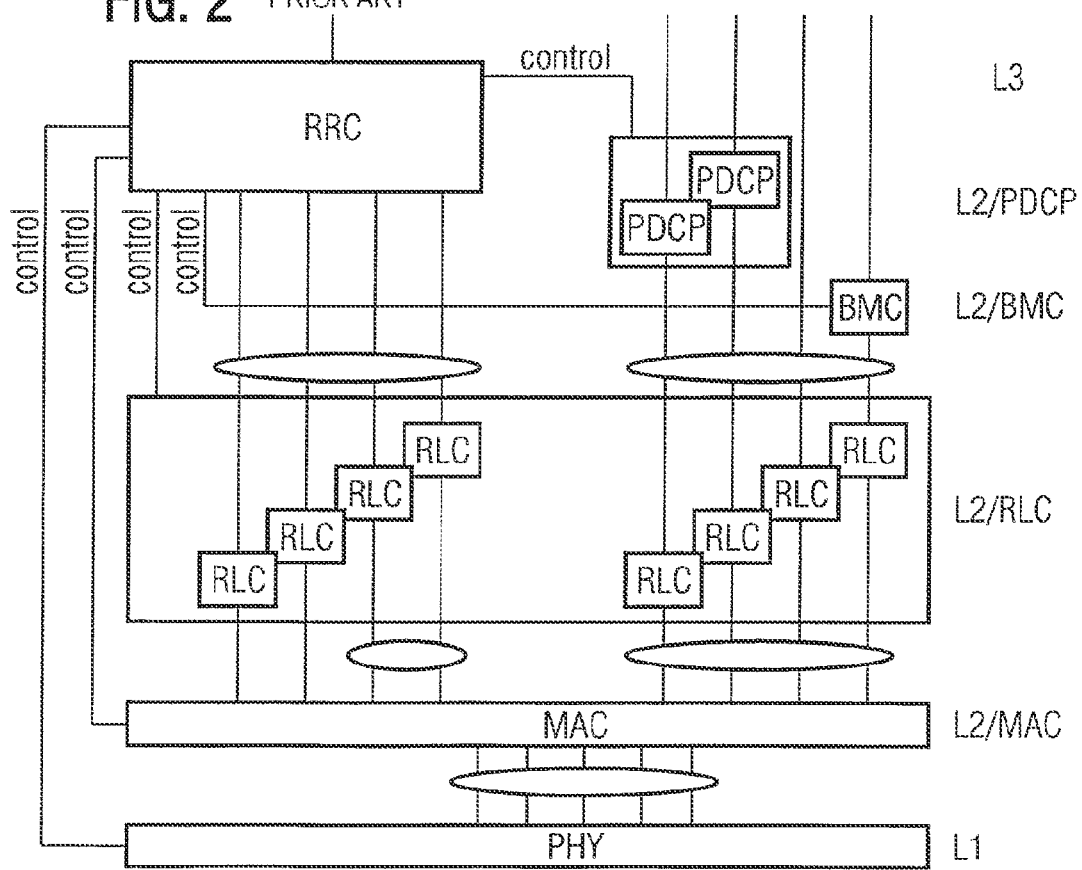
FIG. 2 shows the radio interface protocol architecture in a communication system in the state of the art.

FIG. 2 shows an example of subdivided layers in a communication system with a layered protocol structure as described in 3$^{rd}$ Generation Partnership Project specification 3GPP TS 25.301. Embodiments of the invention are described using this system as an example although the invention is not restricted to a WCDMA system and can be applied to any communication system with a layered protocol stack if the system has channel access delays and timers controlling the transmission or performs a scheduling of data packets.

In FIG. 2, the data link layer L2 between the physical layer L1 and the network layer L3 with the radio resource control RRC is subdivided and comprises the protocols PDCP, BMC and MAC. Higher layers control the functionality in lower layers as indicated by lines. The functionality of some layers, e.g. PDCP, is only attributed to selected connections. In the protocols PDCP and RLC (radio link control), separate function entities are attributed to different connections. As indicated by the oval shapes, interfaces allow a redistribution of information between connections on the different layers.

The protocol RLC is an ARQ (Automatic Repeat Request) protocol and a further sub-layer of the data link layer L2. Timers are part of the ARQ functionality and are started when RLC packet data units are transferred to the MAC protocol layer for further transfer to the physical layer. Since the delay introduced by MAC between the reception and further transfer of packet data units can vary considerably, it is impossible to set the timers in RLC to optimal values. The delay introduced before transmission on a channel can also depend on external parameters. For example, RACH load control parameters like the persistence value in a communication system according to 3GPP specifications are broadcast by the radio network nodes, e.g. base stations, to adapt delays to the present interference level or to the present load of the communication system and avoid congestion.

Figure 3:
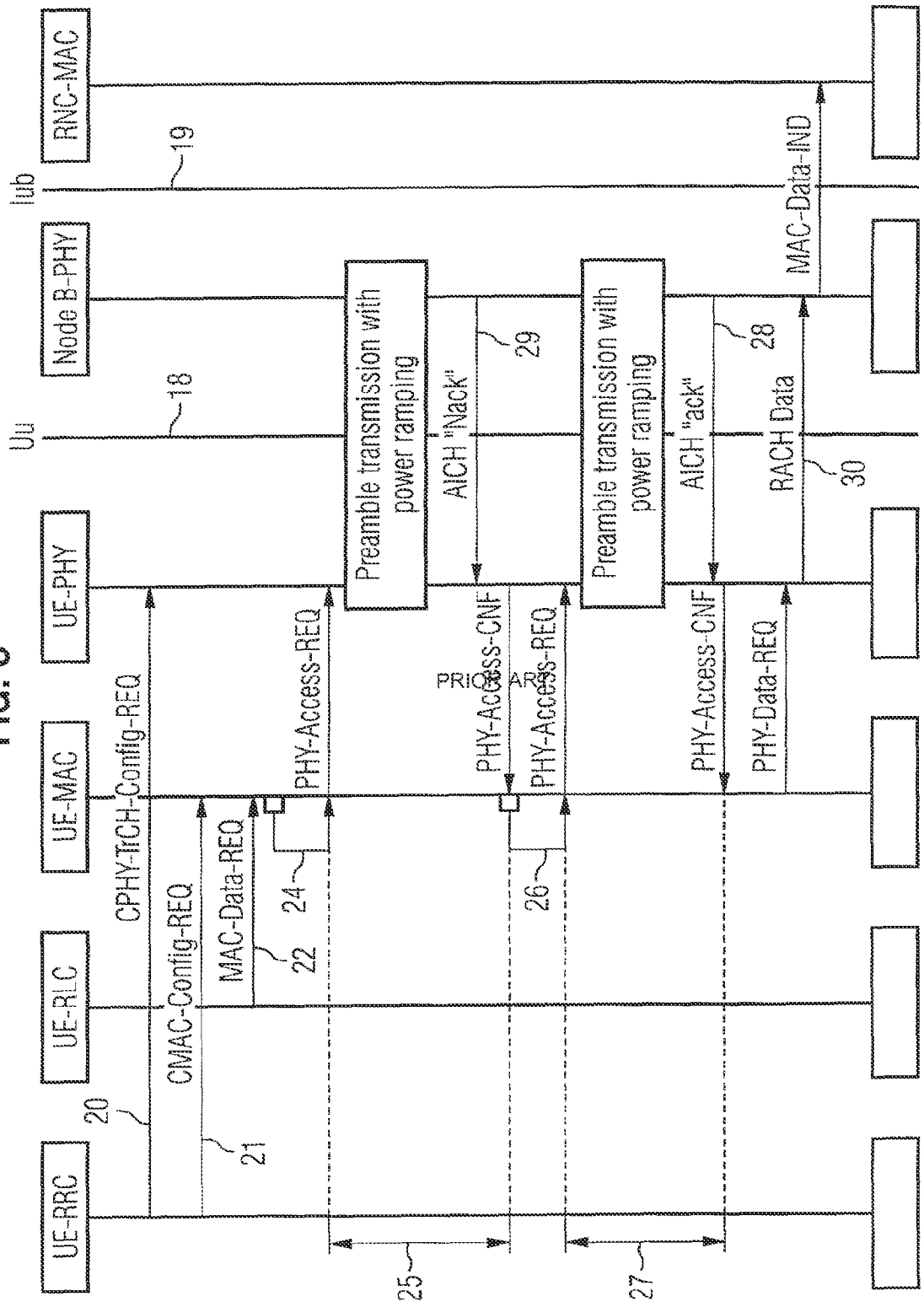
FIG. 3 shows a random access transmission sequence in a communication system in the state of the art.

FIG. 3 shows service primitives sent between the involved protocols when RLC packet data units are transmitted from a user equipment on the random access channel in a WCDMA system in the state of the art. Details of the depicted primitives, messages and interfaces are described in 3GPP TS 25.303. The wireless connection between user equipment UE and base station BS is performed over the interface 18 Uu while the connection between base station and the controller RNC corresponds to the interface 19 Iub. The part left of the interface Uu in FIG. 3 describes the handling of data within the user equipment.

For the initiation of a transmission between the user equipment and a base station, upper layers at first perform a configuration of lower protocol layers by corresponding primitives 20, 21. Then, the primitive 22 "MAC-Data-Req" transfers data packets for transmission from the RLC protocol to the MAC protocol. Furthermore, the time of sending primitive 22 "MAC-Data-Req" is used in the state of the art to start timers within RLC although the transmission on the Uu interface 18 is not started until a message 30 "RACH Data". Before message 30, an initial back-off time 24 elapses. A further delay 25 is due to the channel access attempts that are performed repeatedly with increasing power until a successful reception of a transmission header is confirmed by the radio base station BS with an acknowledgement 28. Still further delays may be caused by one or more subsequent back-off times 26 with corresponding access delays 27 if the first access attempt was unsuccessful, e.g. rejected by a negative acknowledgement 29. As a result, typical total channel access delays between the primitive "MAC-Data-Req" 22 and the transmission of the packet data units on the RACH from the user equipment to the radio base station with the message 30 "RACH Data" can vary between 10 ms and 1.5 s with even higher values possible in congested situations.

Figure 4:
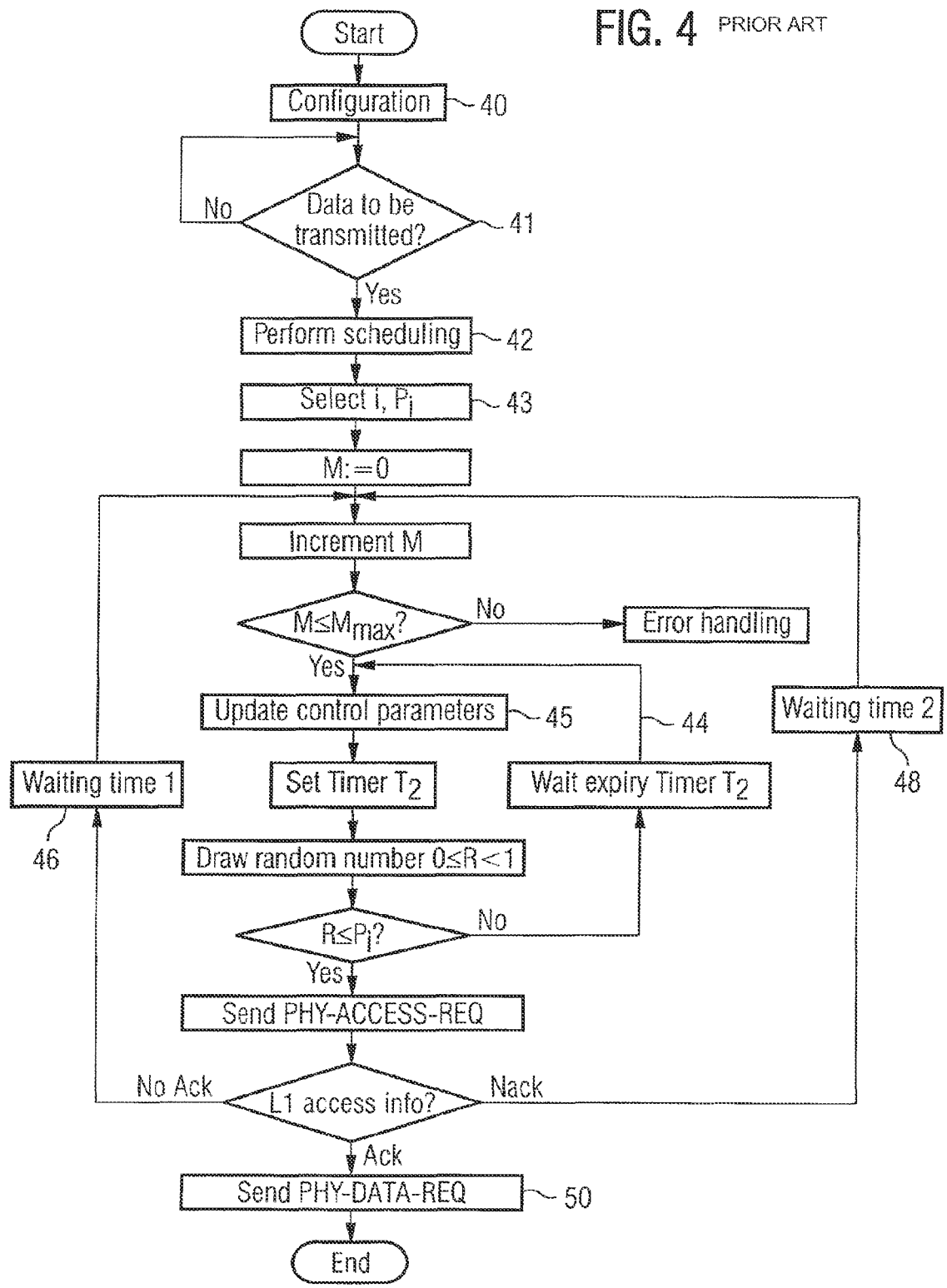
FIG. 4 shows a random access channel transmission control procedure in the state of the art.

FIG. 4 shows the corresponding flow chart for the transmission control procedure in the MAC protocol as described in detail in 3G TS 25.321. After configuration 40, checks 41 are performed by the MAC protocol whether data packets are ready for transmission. If this is the case, a scheduling according to the priority of the data packets is performed in step 42. Furthermore, a variable access back-off delay is enabled by assigning a constant $P_i$ to data packets or groups of data packets i in step 43. A loop 44 is entered which delays the channel access for a random time to avoid access collisions. To accomplish a statistical distribution of accesses, a random number is calculated and compared to the constant $P_i$ attributed to a data packet or group of data packets. Loop 44 which corresponds to the initial back-off time is ended when the random number is smaller than or equal to constant $P_i$ while else a further random draw is performed after a waiting period. By transmitting a message to initiate an update 45 to change allowed ranges for the constant $P_i$, the network is able to control the load on the random access channel.

After the initial back-off delay, access attempts are performed as described with respect to FIG. 3. In case of a successful attempt, the data is forwarded to the physical layer for transmission to the base station in step 50. Else loop 44 is again entered after a waiting time 46, 48. Different lengths of the waiting time 46, 48 can be specified if the user equipment can distinguish different reasons for an unsuccessful access. A counter M ensures an error handling if a specified number of access attempts was unsuccessful.

Figure 5:
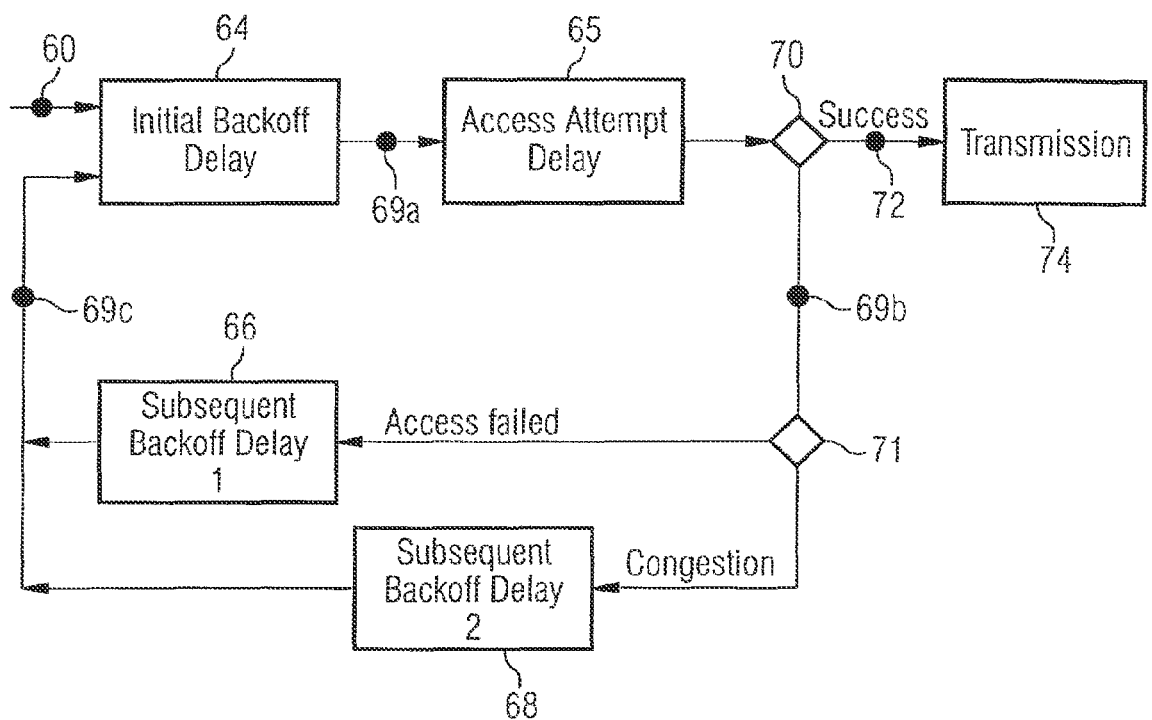
FIG. 5 shows a schematic random access control procedure according to the invention.

The proposed methods comprise two basic parts which are both depicted in FIG. 5. In a first part, different protocol layers within a user equipment are synchronized so that timers are not started too early or late when a transmission of data is delayed. The start of the timers is synchronized with the actual transmission of data on a channel, e.g. a random access channel. The corresponding communication system includes a first protocol, e.g. RLC, with timers determining the processing of data by the first protocol. Other protocols, e.g. MAC, add delays before protocol data units generated by the first protocol are transmitted on a physical channel in the communication system. The start of timers in the first protocol is synchronized with the event that the data is transmitted on the physical channel.

Said first part improves the interlayer communication, for example between the physical layer, MAC and RLC in a user equipment. It enables higher layers to consider delays caused by lower layers, e.g. allows to MAC and RLC to react to changes in the random access delay. The indication to start timers is performed upon successful channel access which avoids variations and inaccuracies caused by the delays, e.g. in a random access procedure.

In a second part, a rescheduling of data ready for transmission on a channel is performed when additional data becomes available. The corresponding communication system includes a protocol, e.g. MAC, that performs the scheduling of data units for transmission. If transmissions on the channel are delayed, e.g. due to access attempt delays or back-off times, rescheduling of additionally received data is performed by said protocol before previously received data is transmitted. The second part enables the protocol to perform rescheduling especially during a random access control procedure when the traffic situation has changed.

Both parts are illustrated in the schematic block diagram of FIG. 5 which comprises components of a typical random access procedure for a user equipment in the protocol controlling the transmission, e.g. in the MAC sub-layer of the data link layer. Random access procedures in a mobile communication system typically consist of several components, all contributing to the total delay that packets from higher layer experience during the procedure. Details of the access procedure can vary depending on the communication system considered.

After data packets are forwarded from a higher layer in the protocol stack in step 60 for transmission, an initial back-off delay 64 spreads random access attempts in time to minimize the collision probability during the channel access phase when more than one user equipment uses the same random access channel. The length of initial back-off delay 64 is variable following a statistical distribution, e.g. due to a loop 44 as described above, and parameters influencing the length of the delay can be varying in time. The subsequent access attempt delay 65 corresponds to the time required to access the random access channel. For instance in a communication system applying Carrier Sense Multiple Access (CSMA), access attempt delay 65 preferably corresponds to the carrier sense phase, in which the channel is sensed for ongoing transmissions from other parties. In a communication system using power ramping, access attempt delay 65 preferably corresponds to the power ramping phase. The power ramping adapts the transmission power of user equipment to the present channel conditions and consists of subsequent preamble transmission attempts with increasing power. When a sufficient power level is reached, i.e. when the preamble is successfully received by a radio base station, the network acknowledges the preamble. The reception of the acknowledgement ends the access attempt delay 65.

When an access attempt during the access attempt delay 65 is successful as detected in check 70, the transmission 74 of the data on a physical channel is performed. If the result of check 70 is that a channel access attempt has failed, the protocol falls back into a subsequent back-off delay 66, 68. In FIG. 5, the protocol distinguishes different reasons for a failed attempt in further check 71 and the duration of the subsequent back-off delay 66, 68 depends on the reason for the unsuccessful channel access. When the user equipment does not receive an acknowledgement from the network confirming a successful channel access, the subsequent access is delayed by a certain amount of time as indicated by "Subsequent Backoff Delay 1" 66. If a negative acknowledgement as an indication of congestion is returned from the network, the user equipment uses a longer "Subsequent Backoff Delay 2" 68 to ease the load on the channel. Additional reasons corresponding to further subsequent back-off branches are possible.

When timers in a higher layer of the communication system are started with forwarding step 60, the starting of the timers may differ significantly from the time of the physical transmission 74 due the variable and often unpredictable lengths of delays 64-66, 68. Therefore, it is proposed that the depicted protocol layer informs a higher protocol layer close to the time of the physical transmission 74 in step 72, e.g. by a primitive, when the data is forwarded to the physical layer after check 70 indicated a successful access attempt. In this way it is ensured that the timers are started at the time of transmission. If a processing time is necessary for the data packets between check 70 and transmission 74, the length of the processing time is constant and can therefore be considered in setting timers and it is generally small compared to the delays 64, 65.

In one embodiment, the proposed rescheduling 69*a* is performed after the initial back-off delay 64. The user equipment is not in control of the duration of the access attempt delay 65 which is determined as described above by transmission conditions or behavior of other users of the communication system and therefore generally unpredictable. Implementation reasons can require to perform the rescheduling a period of time before transmission 74. For example, for a communication system according to 3GPP specifications, transmission 74 is specified to start within a limited period after an acknowledgement by the network indicates a successful access attempt. This period is not always sufficient for data packet processing. Therefore, a suitable time for the rescheduling 69a is before access attempt delay 65 to provide sufficient time for the user equipment for packet processing like for example channel coding, interleaving or cyclic redundancy check calculation.

However, a rescheduling at any time during the channel access delay, i.e. between step 60 and transmission 74, can improve the performance of the communication system. Examples are rescheduling 69b, 69c which may be performed alternatively or in addition to rescheduling 69a. It is possible to reschedule once or more than once and at any time during the channel access delay. It is preferable to perform a rescheduling as close as possible before transmission 74. For a sufficiently high processing speed of the data packets, the preferred time of the rescheduling coincides with step 72 immediately before transmission 74.

It is possible, that data which is to be transmitted on a physical channel is grouped into different access classes. Access classes can correspond for example to data of users with different subscriptions corresponding to different quality-of-service classes to which a user is entitled. In this case, parameters which determine the duration of a delay 64-66, 68 can differ between the access classes. An improvement of the performance can be achieved by allowing a rescheduling between data of different access classes. In other situations it may be advantageous to allow a rescheduling only within a current access class or between a subset of access classes. Different rules for a rescheduling can apply at different times during the channel access delay. Especially, it is possible that a change of the access class is not allowed for a rescheduling at step 72 while it is possible for a rescheduling 69a-69c.

In a random access transmission sequence according to the proposed methods, two new primitives are introduced which are denoted MAC-Re-Schedule primitive 100, 104 and MAC-Data-CNF primitive 108. Primitives 100, 104 MAC-Re-Schedule are used by MAC to request additional data from the RLC protocol. The primitive can for example be sent after a rescheduling has been performed or in order to trigger a rescheduling. The primitive 108 MAC-Data-CNF is used by MAC to inform RLC that the random access control procedure is finished and the transmission of a set of packets has started. RLC uses the reception of primitive 108 as trigger to start timers.

Figure 6:
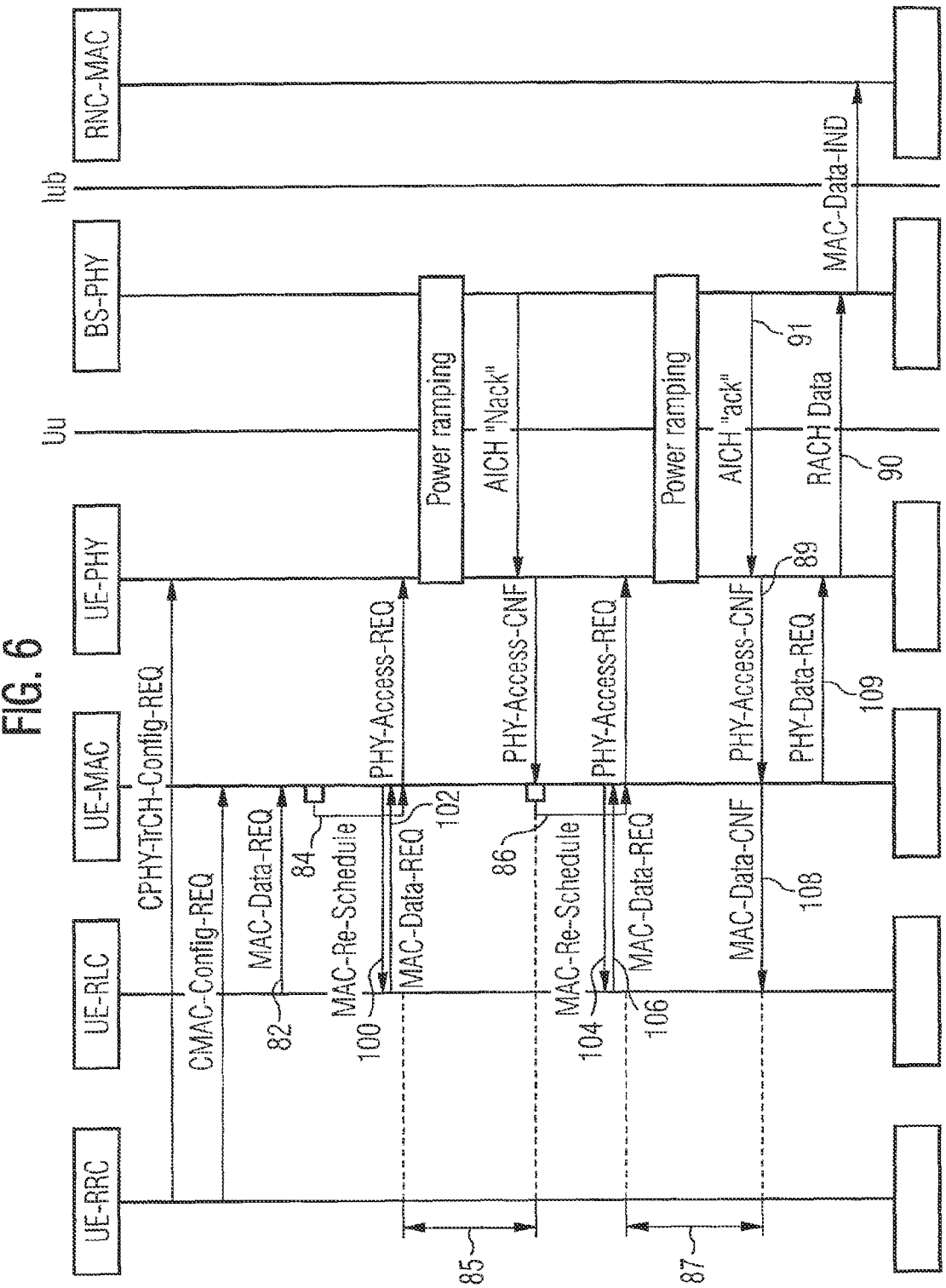
FIG. 6 shows a random access transmission sequence according to the invention.

FIG. 6 depicts how the primitives 100, 104, 108 can be used to improve the random access procedure in a WCDMA system. After a transmission between the user equipment and a base station is initiated and lower protocol layers are configured, the primitive 82 "MAC-Data-Req" indicates to the MAC protocol that one or more RLC protocol data units are ready for transmission. After subsequent initial back-off time 84, additional data with higher priority may be available on RLC. In a preferred embodiment, MAC has access to information on the buffer situation of RLC, for instance by a shared memory area. Based on this information, MAC makes a rescheduling decision in which both the data packets originally scheduled for transmission and the additional data are considered. MAC then informs RLC with the primitive 100 that it has made the rescheduling and that RLC shall prepare the data for transmission according to the rescheduling. The preparation consists of e.g. setting fields in the header of the RLC protocol data unit. When the RLC protocol data units are ready, RLC replies to primitive 100 with the data for transmission according to the rescheduling in primitive 102 "MAC-Data-Req". Persistence value constants $P_i$ assigned to data can be changed after the rescheduling.

A corresponding dialogue with a further rescheduling can be performed after any subsequent back-off time 86 with exchange of a further MAC-reschedule primitive 104 and a further MAC-Data-REQ primitive 106. It should be noted that the subsequent back-off time 86 can comprise different components, e.g. both an initial back-off delay 64 and a subsequent back-off delay 66, 68 as described with respect to FIG. 5. When the MAC protocol layer receives the primitive 89 PHY-Access-CNF indicating the start of the actual transmission, MAC uses the MAC-Data-CNF primitive 108 to inform RLC to start timers. In this way, erroneous timer settings due to the variable back-off times 84, 86 and access delays 85, 87 can be avoided because the offset between the primitive 89 PHY-Access-CNF and the transmission of the data on the physical channel with the message 90 RACH data is constant and predefined.

It should be noted that a rescheduling is possible at any time between primitive 82 MAC-Data-Req and primitive 109 PHY-Data-Req, e.g. initiated by a communication procedure with primitives 100, 102. If the device has sufficient processing speed to perform the data handling in time for the sending of the message 90 RACH data which must, according to 3GPP specifications, be performed in a specified interval after reception of the acknowledgement 91 of a channel access, it is preferable to perform the scheduling close to sending the primitive 109 PHY-Data-Req. For example, primitives 100, 108 could be sent almost simultaneously in this case.

Several alternative embodiments of the invention are possible. Especially, the rescheduling can be performed by the RLC protocol. In this case, the primitives 100, 104 request the rescheduling by the RLC protocol and rescheduled data is transmitted with primitives 102, 106. Different alternative options are applicable for this case:

The RLC protocol can send additional data only if the priority is higher than that of the previous data. In this case, the MAC protocol queues the previous data and forwards the additional data with higher priority. Alternatively, the MAC protocol discards the previous data and the RLC protocol marks the previous data as not sent in the RLC transmission buffer.

The RLC protocol can send to the MAC protocol both the additional data and the original data with the rescheduled priorities. Then the original data packets stored by the MAC protocol are deleted.

FIG. 7 shows an improved RACH transmission control procedure for an alternative embodiment compared to the method depicted in FIG. 6. The MAC rescheduling and triggering of RLC timers is amended compared to FIG. 4 while the other elements in FIG. 7 correspond to those in FIG. 4. After the initial back-off delay in loop 110, a check 112 is performed whether a MAC rescheduling is necessary, e.g. a primitive is sent to RLC to request additional data which is ready for transmission and the reception of a reply with additional data in a primitive is waited for. If additional data packets are received, a rescheduling 114 of the data packets is performed. Additionally, new constants $P_i$ may be assigned to the data packets in step 113 and optionally the parameter M can be reset. The MAC-Re-Schedule primitive is sent in step 115. At a defined time with respect to the initiation of the transmission of data packets on the physical layer by the primitive PHY-DATA-REQ 118, preferably simultaneously to or immediately before or after the sending of primitive 118, the MAC protocol sends a MAC-Data-CNF primitive 108 in step 116 to the RLC protocol. The order of the steps 113, 115 and rescheduling 114 in the previous description can vary, e.g. depending on which protocol performs the scheduling. Furthermore, a rescheduling check 112 can be performed at any other time in FIG. 7 between the initial scheduling and the sending of the MAC-Data-CNF primitive in step 116.

The primitives depicted in FIGS. 6, 7A and 7B do not necessarily illustrate a single transfer of information but can also correspond to a communication procedure instead. A depicted primitive can represent an exchange of information between protocols in both directions. Information between protocols can also be exchanged by access to a memory which is shared by two or more protocols. For example, any of the primitives 100, 104 MAC-Data-Req, primitives 102, 106 MAC-Re-Schedule or primitive 108 MAC-Data-CNF can include an exchange of information on RLC buffer levels, changes in RLC buffer levels or transport channel parameters. In this way, information can be exchanged on, e.g., the number of data packets which can be transferred. Corresponding information exchange between the protocols is also possible at other times during the channel access delay, e.g. triggered by the arrival of additional data at the RLC protocol or changes of parameters of the physical channel.

RLC timers are very sensitive to changes in round trip time and only with an exact value it is possible to configure RLC in an optimum way for RACH transmissions. The transmission in the reverse direction, i.e. in the down-link from base station to user equipment, is generally performed on a Forward Access Channel (FACH). The proposed methods allow to set the RLC timers according to the actual transmission time. The RLC round trip time then depends only on the variable Forward Access Channel scheduling delay in the down-link. In the state of the art it additionally depends on the variable RACH access delay in the up-link. Therefore, one of two variable contributions to the round trip time is removed and the estimation of the round trip time improved.

By checking before the channel access whether additional data is ready for transmission, rescheduling of data according to priorities at the moment of transmission is possible. This allows to give priority to important RLC packet data units close to the actual transmission time and avoid situations in which important traffic is delayed by less important traffic.

The proposed methods can be used both in a communication system with Frequency Division Duplex (FDD) and with Time Division Duplex (TDD).

The above embodiments admirably achieve the objects of the invention. However, it will be appreciated that departures can be made by those skilled in the art without departing from the scope of the invention which is limited only by the claims.

What is claimed is:

1. A method for efficient transmission in a mobile communication system with a layered protocol stack, the layered protocol stack comprising an upper protocol layer, a lower protocol layer, and a physical layer, the method comprising:
    initiating a transmission, by a control procedure of the lower protocol layer, with a variable channel access delay that comprises at least two separate components including a component of random length;
    detecting, by the lower protocol layer, a start of the transmission;
    indicating to the upper protocol layer, by the lower protocol layer, a time associated with the start of transmission, wherein the indication is sent between the at least two separate components of the variable channel access delay and prior to the component of random length; and
    starting at least one timer of the upper protocol layer according to the indication from the lower protocol layer at the time associated with the start of transmission.

2. The method of claim 1, wherein the at least one timer models a measure of time selected from the group consisting of a round trip time and a back-off time.

3. The method of claim 1, wherein the indication from the lower protocol layer is sent at the start of the transmission or at the end of a delay.

4. The method of claim 1, wherein the transmission comprises at least one data packet and a scheduling process is finished immediately before the physical layer transmits the at least one data packet.

5. The method of claim 1, wherein the indication from the lower protocol layer is a primitive.

6. The method of claim 5, wherein the primitive is a MAC-Data-CNF primitive.

7. The method of claim 1, wherein the lower protocol layer is a medium access control sub-layer of a data link layer.

8. The method of claim 1, wherein the at least one timer is at least one of a round trip timer and a back-off timer.

9. The method of claim 1, wherein the transmission is performed on a channel that can be shared by at least one of a plurality of several users and data flows.

10. The method of claim 1, wherein the start of transmission is delayed by an offset, and the time associated with the start of transmission is corrected by the offset.

11. A device for efficient transmission in a mobile communication system, comprising:
    a controller,
    a memory, and
    a layered protocol stack, the layered protocol stack comprising an upper protocol layer, a lower protocol layer, and a physical layer,
    the controller, working together with the memory and the lower protocol layer, being configured to:
        initiate a transmission, by a control procedure of the lower protocol layer, with a variable channel access delay that comprises at least two separate components including a component of random length,
        detect an indication of the start of the transmission from the physical layer, and
        provide an indication of a time associated with the start of transmission to the upper protocol layer, wherein the indication is sent between the at least two separate components of the variable channel access delay and prior to the component of random length; and
    the controller, working together with the memory and the upper protocol layer, being configured to:
        start at least one timer of the upper protocol layer according to the indication from the lower protocol layer at the time associated with the start of transmission.

12. The device of claim 11, wherein the device is one of a user equipment or a network node.

13. The device of claim 11, wherein the at least one timer is at least one of a round trip timer and a back-off timer.

14. The device of claim 11, wherein the at least one timer models a measure of time selected from the group consisting of a round trip time and a back-off time.

15. The device of claim 11, wherein the indication from the lower protocol layer is sent at the start of the transmission or at the end of a delay.

16. The device of claim 11, wherein the transmission comprises at least one data packet and a scheduling process is finished immediately before the physical layer transmits the data packet.

17. The device of claim 11, wherein the indication from the lower protocol layer is a primitive.

18. The device of claim 17, wherein the primitive is a MAC-Data-CNF primitive.

19. The device of claim 11, wherein the lower protocol layer is a medium access control sub-layer of a data link layer.

20. The device of claim 11, wherein the start of transmission is delayed by an offset, and the time associated with the start of transmission is corrected by the offset.

* * * * *